US006912318B2

(12) United States Patent
Kajiki et al.

(10) Patent No.: US 6,912,318 B2
(45) Date of Patent: Jun. 28, 2005

(54) METHOD AND SYSTEM FOR COMPRESSING MOTION IMAGE INFORMATION

(75) Inventors: Noriko Kajiki, Tokyo (JP); Satoshi Tanabe, Tokyo (JP)

(73) Assignee: Kabushiki Kaisha Office NOA, Tokyo (JP)

( * ) Notice: Subject to any disclaimer, the term of this patent is extended or adjusted under 35 U.S.C. 154(b) by 872 days.

(21) Appl. No.: 09/750,118

(22) Filed: Dec. 29, 2000

(65) Prior Publication Data

US 2001/0048769 A1 Dec. 6, 2001

(30) Foreign Application Priority Data

| Jun. 6, 2000 | (JP) | 2000-169680 |
| Jul. 19, 2000 | (JP) | 2000-218397 |
| Nov. 1, 2000 | (JP) | 2000-334440 |

(51) Int. Cl.[7] ................................................ G06K 9/00
(52) U.S. Cl. ..................... 382/239; 382/236; 348/404
(58) Field of Search ........................... 382/239, 232, 382/236, 246, 265; 341/51; 348/404–407, 419; 358/426.02–426.06; 704/270.1

(56) References Cited

U.S. PATENT DOCUMENTS

| 4,734,784 A | * | 3/1988 | Tanaka ...................... 358/2.1 |
| 4,831,659 A | * | 5/1989 | Miyaoka et al. ............. 382/240 |
| 5,177,608 A | | 1/1993 | Ohki et al. |
| 5,193,001 A | * | 3/1993 | Kerdranvrat ................ 348/701 |
| 5,315,670 A | * | 5/1994 | Shapiro ....................... 382/240 |
| 5,321,776 A | * | 6/1994 | Shapiro ....................... 382/240 |
| 5,367,385 A | * | 11/1994 | Yuan ........................... 358/465 |
| 5,467,409 A | * | 11/1995 | Yamamoto .................. 382/285 |
| 5,485,213 A | * | 1/1996 | Murashita et al. ...... 375/240.12 |
| 5,864,678 A | * | 1/1999 | Riddle ......................... 709/235 |
| 5,870,754 A | * | 2/1999 | Dimitrova et al. ......... 707/104.1 |
| 5,909,252 A | * | 6/1999 | Ueda et al. ............. 275/240.12 |
| 5,912,991 A | * | 6/1999 | Jeon et al. ................... 382/242 |
| 6,018,366 A | * | 1/2000 | Asai et al. .............. 375/240.18 |

(Continued)

FOREIGN PATENT DOCUMENTS

| EP | 0 476 603 A2 | 9/1991 |
| EP | 0 750 428 A2 | 6/1996 |
| JP | 62-101183 | 5/1987 |
| JP | 62-120791 | 6/1987 |
| JP | 04-129491 | 4/1992 |
| JP | 05-064015 | 3/1993 |
| JP | 06-237455 A1 | 8/1994 |
| JP | 09-009265 | 1/1997 |
| JP | 09-037246 A1 | 2/1997 |
| JP | 10-098620 | 4/1998 |
| JP | 11-164305 | 6/1999 |
| JP | 11-289542 | 10/1999 |
| JP | 2000-165873 A1 | 6/2000 |

Primary Examiner—Timothy M. Johnson
Assistant Examiner—Barry Choobin
(74) Attorney, Agent, or Firm—Rader, Fishman & Grauer PLLC (57) ABSTRACT

A method and system are disclosed for compressing motion image information by means of predictive coding with a high compression ratio while maintaining high image quality. An image in each frame is divided into blocks in advance, and each of all blocks is approximated by (replaced with) a single plane defined by three data representing the magnitude of the intensity of the block, the block-to-block gradient of the intensity in the x direction, and the block-to-block gradient of the intensity in the y direction. Furthermore, corresponding pixels are compared with each other in each block consisting of n×m pixels between frames, and differential information is generated according to the comparison result. Pixels indicated as being not greater than a parameter is treated (deleted) as pixels having no difference between frames. Information compression is performed for pixels indicated as being greater than the parameter.

20 Claims, 6 Drawing Sheets

U.S. PATENT DOCUMENTS 6,028,967 A * 2/2000 Kim et al. .................. 382/268
6,061,474 A    5/2000 Kajiwara et al.
6,151,409 A * 11/2000 Chen et al. ................. 382/166
6,201,896 B1 * 3/2001 Ishikawa .................... 382/236
6,233,008 B1 * 5/2001 Chun ......................... 348/170
6,260,171 B1 * 7/2001 Gray .......................... 714/771
6,408,109 B1 * 6/2002 Silver et al. ................ 382/300

* cited by examiner

FRAME(t)

FIG. 7B

FRAME(t+1)

METHOD AND SYSTEM FOR COMPRESSING MOTION IMAGE INFORMATION

BACKGROUND OF THE INVENTION

1. Field of the Invention

The present invention relates to a method and system for compressing motion image information data by means of predictive coding with a high compression ratio and with high image quality.

2. Description of the Related Art

In image signal transmission, an image signal is first converted to another signal and then coded by assigning proper codes selected according to the statistical feature of the converted signal. When the image has high redundancy within a frame as is the case with an image including a regular pattern or a plain image, there is a high correlation between adjacent pixels, and thus it is possible to predict, to a certain degree, a pixel value to be coded next from a pixel value which has already been coded. Therefore, if components which could not be predicted are extracted, and the coding is performed only for these extracted components, it becomes possible to compress information with a large compression ratio. This technique is called the predictive coding.

In the case of a motion image in a video telephone or the like, images of adjacent frames are very similar to each other, and thus the temporal change is limited. Such temporal redundancy can be removed by means of interframe predictive coding on the basis of interframe prediction. In this case, a block code is generally employed in which one codeword is assigned to one symbol, and one frame is divided into a plurality of pixel blocks so that the luminance difference within each block becomes smaller than within the entire frame. The smaller luminance difference within each block allows compression of information. This technique is called block coding.

Entropy coding is known in the art as a coding technique which achieves data compression by assigning a high efficiency code to the converted signal. Huffman coding is known as a method for generating a high efficiency code. A representative example of the high efficiency code is an arithmetic code in which a probability numeric line is divided into segments in accordance with the occurrence probability of a symbol system, and a binary decimal number indicating a location in a segment is employed as a code for the symbol system. Codewords are generated one by one by performing the arithmetic process described above.

A 3-step block coding system is known in the art as a technique for coding an image signal in an efficient manner. This technique consists of 3 steps: sampling; conversion; and quantification. In this technique, in order to retain a two-dimensional resolution and high-frequency components of a given image signal, it is generally required to perform sampling at a frequency twice the highest frequency component.

However, in the conventional image signal compression technique, because of the complexity of the block coding process, it is difficult to achieve both a high compression ratio and a high speed in the predictive compression coding of image data or audio data.

When differential information is compressed in the motion image compression process, that is, when successive values A1 and A2 are predicted to be similar to each other and when the value A1 is known before the value A2 occurs, the difference A2−A1 is regarded as having a value near 0, and compression is performed using the conventional Huffman code or arithmetic code. However, if A1 and A2 can each take one of values 0, . . . , n, the difference A2−A1 can have one of 2n+1 values. As a result, it is required to prepare 2n+1 Huffman codewords. However, A2 can actually take one of n values, and thus n codes are not used from the local point of view. This means that the code includes a large amount of redundancy. Furthermore, when a difference between frames is great, significant degradation in image quality occurs, and a high-quality image cannot be obtained.

In view of the above, it is an object of the present invention to provide a method and system for compressing data such as image information or audio information by means of predictive coding with a high compression ratio while maintaining high image quality.

SUMMARY OF THE INVENTION

According to an aspect of the present invention, to achieve the above object, there is provided a method of compressing motion image information, comprising the steps of: comparing pixels in a frame with corresponding pixels in a spatially or temporally adjacent frame and generating differential information in accordance with the comparison result; generating and storing a 1-bit bit map indicating whether the differential information is greater or not greater than a given parameter; and compressing information of a pixel indicated as being greater than the parameter thereby reducing redundant information between frames, the method being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

According to another aspect of the present invention, to achieve the above object, there is provided a method of compressing motion image information, comprising the steps of; comparing pixels in a frame with corresponding pixels in a spatially or temporally adjacent frame and generating differential information in accordance with the comparison result; generating and storing a 1-bit bit map indicating whether the differential information is greater or not greater than a given parameter; treating (deleting) information of a pixel, indicated as being not greater than the parameter, as a pixel having no difference between frames; and compressing information of a pixel indicated as being greater than the parameter, the method of compressing image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

According to still another aspect of the present invention, to achieve the above object, there is provided a method of compressing image information, by means of comparing spatially or temporally adjacent pixels to each other and generating differential information so as to reduce redundant information between frames, the method including the steps of: comparing corresponding pixels to each other between frames and generating and storing a 1-bit bit map indicating whether the absolute value of the difference thereof is greater or not greater than a given parameter; and compressing information of a pixel indicated as being greater than the parameter thereby reducing redundant information between frames, the method being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

According to still another aspect of the present invention, to achieve the above object, there is provided a method of compressing image information, by means of comparing spatially or temporally adjacent pixels to each other and generating differential information so as to reduce redundant information between frames, the method including the steps of: comparing corresponding pixels to each other between frames and generating and storing a 1-bit bit map indicating whether the absolute value of the difference thereof is greater or not greater than a given parameter; treating (deleting) information of a pixel, indicated as being no greater in the absolute value of the difference than the parameter, as a pixel having no difference between frames; and compressing information of a pixel indicated as being greater than the parameter, the method of compressing image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

Preferably, the 1-bit bit map information stored in the bit map is compressed by means of a binary image coding method such as a run length, modified READ (MR, MMR), modified Huffman (MH), or JBIG coding method.

Furthermore, information of a pixel indicated as being greater in the absolute difference value than the parameter is preferably compressed by means of an adaptive Huffman coding process including as many Huffman tables as the amount of predicted information.

According to still another aspect of the present invention, to achieve the above object, there is provided a system for compressing motion image information, including entropy coding means or circuit for reduces redundant information between frames by means of comparing spatially or temporally adjacent pixels to each other and generating differential information, the system including: bit map information storage means or circuit for comparing pixels t and corresponding pixels t−1 to each other between frames and generating and storing a 1-bit bit map indicating whether the absolute value of the difference thereof is greater or not greater than a given parameter; and information compression means or circuit for compressing information of a pixel indicated, by the bit map stored in the bit map information storage circuit, as being greater in the absolute difference value between pixels t and t−1 than the parameter, the system for compressing, motion image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

According to still another aspect of the present invention, to achieve the above object, there is provided a system for compressing motion image information, including entropy coding circuit for reducing redundant information between frames by means of comparing spatially or temporally adjacent pixels to each other and generating differential information, the system including: bit map information storage circuit for comparing pixels t and corresponding pixels t−1 to each other between frames and generating and storing a 1-bit bit map indicating whether the absolute value of the difference thereof is greater or not greater than a given parameter; and information compression circuit which treats (deletes) information of a pixel indicated, by the bit map stored in the bit map information storage circuit, as being not greater in the absolute difference value between pixels t and t−1 than the parameter, and which compresses information of the other pixels indicated as being greater in the absolute difference value than the parameter, the system for compressing motion image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

Preferably, the 1-bit bit map information stored in the bit map information storage circuit is compressed by means of a binary image coding method such as a run length, modified READ (MR, MMR), modified Huffman (MH), or JBIG coding method.

Preferably, the information compression circuit for compressing information of a pixel indicated as being greater in the absolute difference value than the parameter performs the information compression by means of an adaptive Huffman coding process including as many Huffman tables as the amount of predicted information.

Preferably, the entropy coding circuit includes adaptive arithmetic coding circuit which has as many arithmetic tables as the amount of predicted information and which performs coding in accordance with an arithmetic table selected from the plurality of arithmetic tables.

According to still another aspect of the present invention, to achieve the above object, there is provided a method of compressing motion image information, by means of comparing spatially or temporally adjacent pixels to each other and outputting differential information thereby reducing redundant information between frames, the method including the steps of: comparing corresponding pixels to each other in each block consisting of n×m pixels (n and m are integers equal to or greater than 2) between frames and generating and storing a 1-bit bit map indicating whether the absolute value of the difference thereof is greater or not greater than a given parameter; and compressing information of a pixel indicated as being greater than the parameter, the method of compressing image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

According to still another aspect of the present invention, to achieve the above object, there is provided a method of compressing motion image information, by means of comparing spatially or temporally adjacent pixels to each other and outputting differential information thereby reducing redundant information between frames, the method including the steps of: comparing corresponding pixels to each other in each block consisting of n×m pixels (n and m are integers equal to or greater than 2) between frames and generating and storing a 1-bit bit map indicating whether the absolute value of the difference thereof is greater or not greater than a given parameter; treating (deleting) information of a pixel, indicated as being no greater in the absolute value of the difference than the parameter, as a pixel having no difference between frames; and compressing information of a pixel indicated as being greater than the parameter, the method of compressing image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

Preferably, the 1-bit bit map information stored in the bit map is compressed by means of a binary image coding method such as a run length, modified READ (MR, MMR), modified Huffman (MH), or JBIG coding method.

Preferably, information of a pixel indicated as being greater in the absolute difference value than the parameter is compressed by means of an adaptive Huffman coding process including as many Huffman tables as the amount of predicted information.

According to still another aspect of the present invention, to achieve the above object, there is provided a system for compressing motion image information, including entropy coding circuit for reducing redundant information between frames by means of comparing spatially or temporally adjacent pixels to each other and generating differential information, the system including: bit map information storage circuit for comparing corresponding pixels to each other in each block consisting of n×m pixels (n and m are integers equal to or greater than 2) between frames and generating and storing a 1-bit bit map indicating whether the absolute value of the difference thereof is greater or not greater than a given parameter; and information compression circuit for compressing information of a pixel indicated, by the bit map stored in the bit map information storage circuit, as being greater in the absolute difference value between pixels t and t−1 than the parameter, the system for compressing motion image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

According to still another aspect of the present invention, to achieve the above object, there is provided a system for compressing motion image information, including entropy coding circuit for reducing redundant information between frames by means of comparing spatially or temporally adjacent pixels to each other and generating differential information, the system including: bit map information storage circuit for comparing corresponding pixels to each other in each block consisting of n×m pixels (n and m are integers equal to or greater than 2) between frames and generating and storing a 1-bit bit map indicating whether the absolute value of the difference thereof is greater or not greater than a given parameter; information compression circuit which treats (deletes) information of a pixel indicated, by the bit map stored in the bit map information storage circuit, as being not greater in the absolute difference value between pixels t and t−1 than the parameter, and which compresses information of the other pixels indicated as being greater in the absolute difference value than the parameter, the system for compressing motion image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

Preferably, The 1-bit bit map information stored in the bit map information storage circuit is information indicating the difference presence/absence for n×m blocks (n and m are integers equal to or greater than 2) in a frame and is compressed by means of a binary image coding method such as a run length, modified READ (MR, MMR), modified Huffman (MH), or JBIG coding method.

Preferably, the information compression circuit for compressing information of a pixel indicated as being greater in the absolute difference value than the parameter performs the information compression by means of an adaptive Huffman coding process including as many Huffman tables as the amount of predicted information.

Preferably, the entropy coding circuit includes adaptive arithmetic coding circuit which has as many arithmetic tables as the amount of predicted information and which performs coding in accordance with an arithmetic table selected from the plurality of arithmetic tables.

The method and system for compressing motion image information according to the present invention are characterized in that an image in each frame is divided into blocks in advance, and each of all blocks is approximated by (replaced with) a single plane defined by three intensity data representing the magnitude of the intensity of the block, the block-to-block gradient of the intensity in the x direction, and the block-to-block gradient of the intensity in the y direction.

Furthermore, corresponding pixels are compared with each other in each block consisting of n×m pixels (n and m are integers equal to or greater than 2) between frames, and differential information is generated according to the comparison result so as to reduce redundant information between frames. That is, pixels t in a frame are compared with corresponding pixels t−1 in a previous frame, pixel by pixel, and 1-bit bit map is generated which indicates whether the absolute value of the difference is greater or not greater than a given parameter.

In the entropy coding process, codes which will appear in successive frames are predicted, and small deviations from predicted codes are output thereby reducing the redundancy of information. The other information is compressed by means of adaptive Huffman coding or adaptive arithmetic coding in which coding is performed on the basis of a table selected from a plurality of tables in accordance with predicted information.

BRIEF DESCRIPTION OF THE DRAWINGS

FIGS. 7A and 7b illustrate an interframe compression process, wherein

DESCRIPTION OF THE PREFERRED EMBODIMENT

Figure 1:
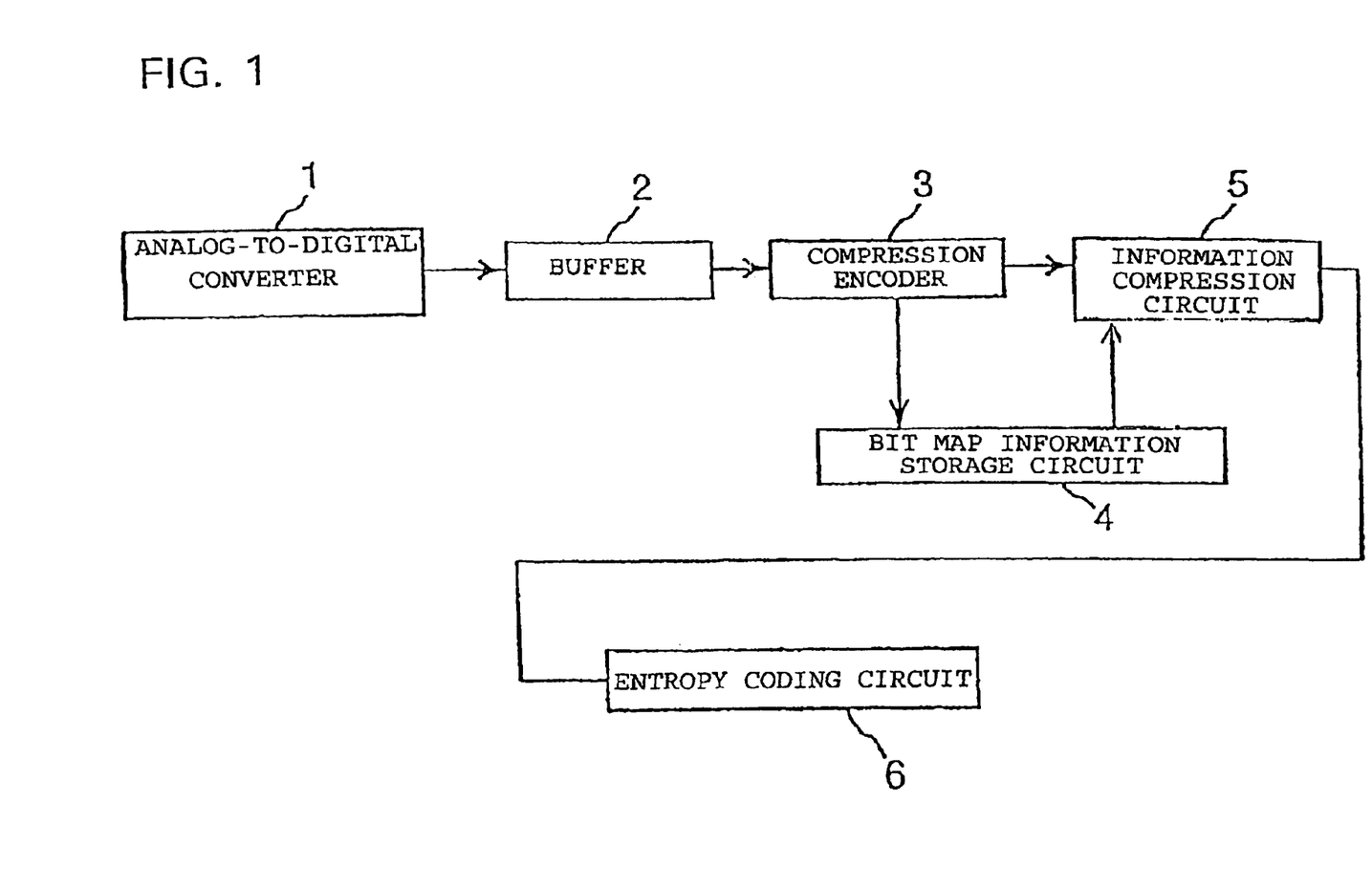
FIG. 1 is a block diagram schematically illustrating a process of compressing motion image information.

The present invention is described in further detail below with reference to an embodiment in conjunction with the accompanying drawings. FIG. 1 is a block diagram schematically illustrating a process of compressing motion image information. A composite analog signal output from a device such as a video camera, a disk player, or a video cassette player, according to the NTSC standard, is input to an analog-to-digital converter 1. The analog-to-digital converter 1 converts the applied analog signal to a digital signal representing one line of a video frame. The resultant digital signal is stored in a buffer 2. Although in the technique shown in FIG. 1 an analog signal output from the device according to the NTSC standard is converted by the analog-to-digital converter 1 into a digital signal and stored in the buffer 2, the signal to be compressed according to the present invention is not limited to such a signal. That is, the technique according to the present invention can be used to efficiently compress any image signal output from a wide variety of devices.

Figure 2:
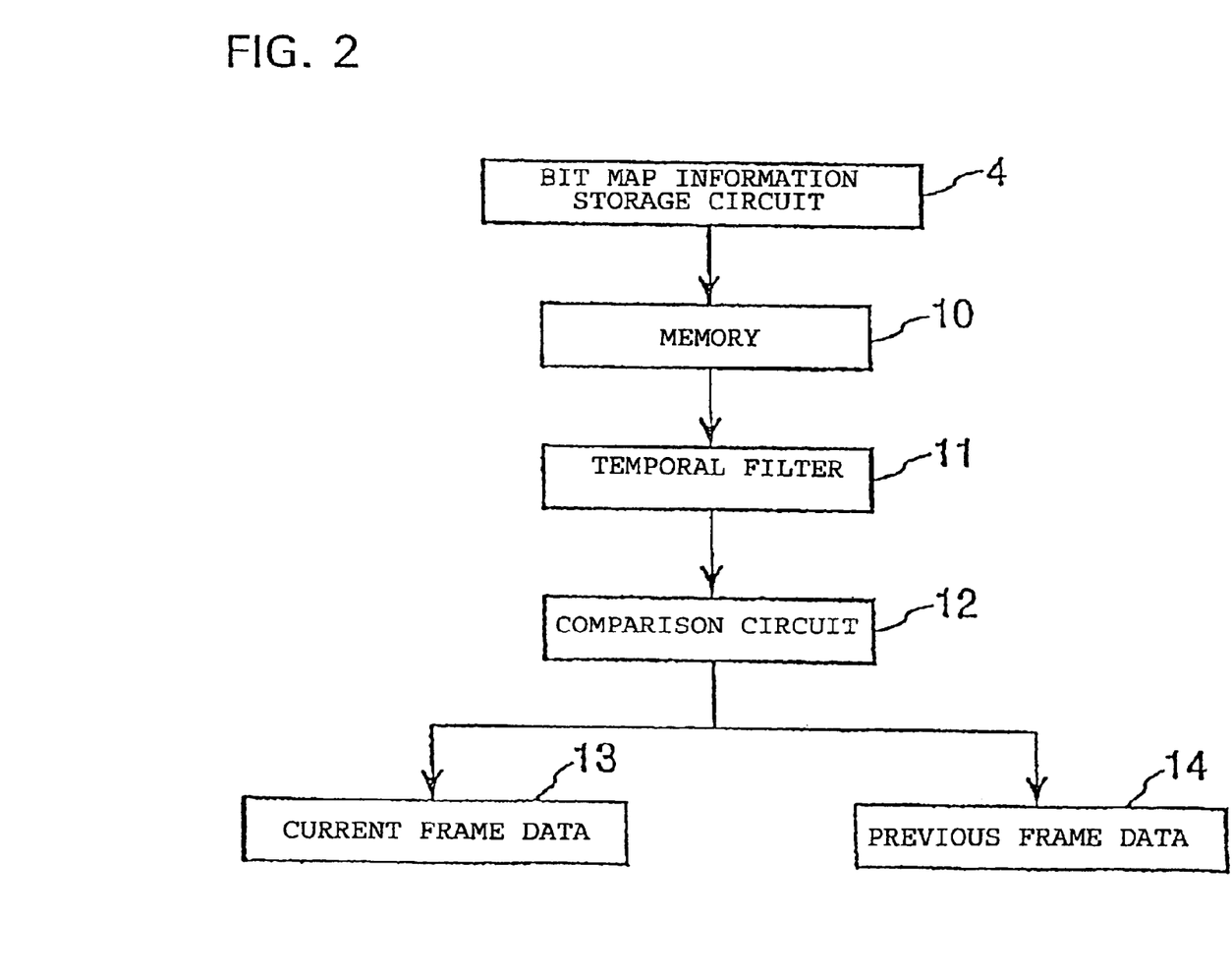
FIG. 2 is a block diagram schematically illustrating a comparison process performed in accordance with information stored in bit map information storage circuit.

As shown in FIG. 1 or 2, the compression encoder 3 includes bit map information storage circuit a for comparing pixels t and corresponding pixels t−1 to each other between frames and generating and storing a 1-bit bit map indicating whether the absolute value of the difference thereof is greater or not greater than a given parameter P. The comparison between the pixels t and the pixels t−1 is performed in terms of their element (brightness or hue). Herein, t denotes time. That is, pixels (pixels t) in a frame at a current time t are compared with corresponding pixels in a frame (pixels t−1 at locations, in the frame, corresponding to the locations of pixels t−1) at an immediately previous time t−1. The compression encoder further includes information compression circuit 5 which treats (deletes) information of a pixel indicated, by the bit map stored in said bit map information storage circuit 4, as being not greater in the absolute difference value between pixels t and t−1 than the parameter P, and which compresses information of the other pixels indicated as being greater in the absolute difference value than said parameter by means of adaptive Huffman coding using a Huffman table selected from as many Huffman tables as the amount of predicted information. Furthermore, the compression encoder also includes entropy coding circuit 6 for reducing redundant information between frames by means of comparing spatially or temporally adjacent pixels to each other and generating differential information, wherein the entropy coding circuit includes adaptive arithmetic coding circuit which has as many arithmetic tables as the amount of predicted information and which performs coding using an arithmetic table selected from the plurality of arithmetic tables in accordance with the predicted information.

Figure 5:
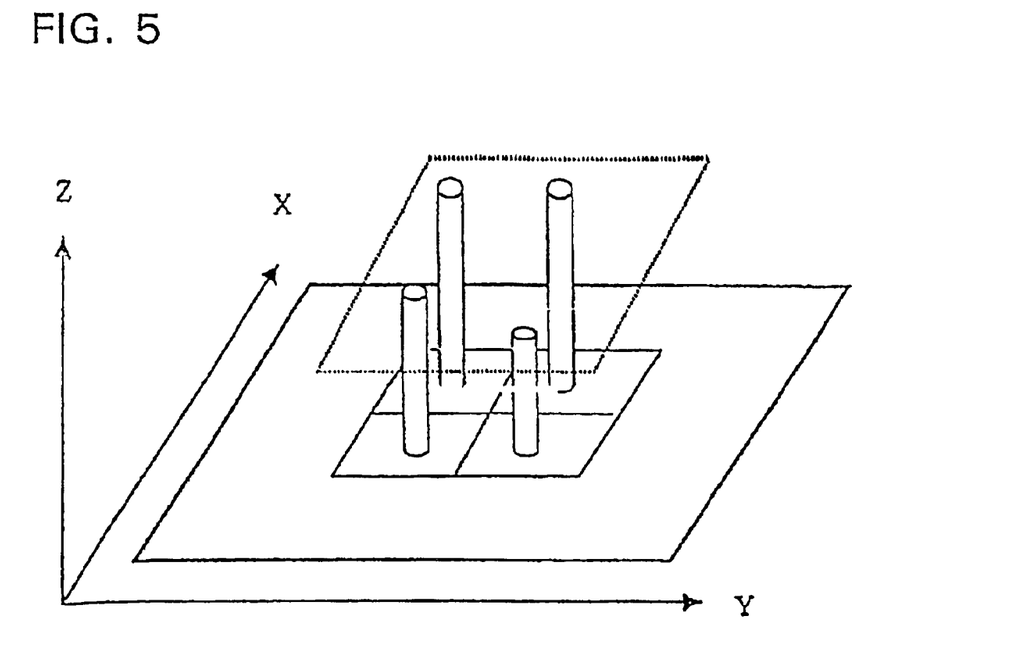
FIG. 5 is a schematic diagram illustrating a plane which is defined by three pixel parameters, the intensity, the gradient in an x direction, and the gradient in a y direction so as to approximate a divided image block.

The present embodiment is based on the intraframe compression in which the block size is fixed. That is, as shown in FIG. 5, an image in a frame is divided into blocks in advance, and each of all blocks is approximated (replaced) by a single plane which is defined by three data representing the magnitude of pixel value of the block, the block-to-block gradient of pixel value in the x direction, and the block-to-block gradient of pixel value in the y direction. That is, in the intraframe compression, an image is first divided into blocks, and then the divided blocks are replaced with a single plane for approximation. The plane is defined by three parameters z, x, and y associated with the pixel value in each block, wherein z is the intensity, x is the gradient in the x direction, and y is the gradient in the y direction. The approximation may be performed, for example, using the least squares method. The reduced (compressed) data obtained in the above-described manner defines a plane which indicates gradation when being decompressed. Herein, if the number of pixels included in each block is equal to s, the intraframe compression ratio is given by 3/s. The intraframe compression ratio increases with s but the image quality becomes worse. The size and the shape of each block are selected arbitrarily, as long as each block consists of n×m pixels where n and m are integers equal to or greater than 2.

As shown in FIG. 2, after completion of the encoding process, block data of each frame is sent to a memory 10 in the bit map information storage circuit 4 and stored therein as previous-frame data for one frame period. Thereafter, the pixel data stored in the memory 10 is filtered by a temporal filter 11 serving as a time variable impulse response filter. After the filtering, the current frame data 13 and the previous frame data 14 are examined by the compression encoder in terms of redundancy between frames and the difference between them is calculated. That is, comparison circuit 12 compares the respective coded blocks with the block corresponding to the previous frame. Each block is added with a single-bit mark indicating whether the block is a new block or the same as the previous block. In this process, a frame bit map is produced such that each block is mapped by one bit. Herein, the bit maps of the respective frames are distinguished from each other by means of comparison between frames.

The basic principles of the interframe compression used in the present embodiment are described below. A first method of interframe compression is as follows. In a frame (t+1) following a current frame t, a block at the same location as that in the current frame is first subjected to the intraframe compression described above so as to obtain three parameters z(t+1), x(t+1), and y(t+1), where z is the intensity, x is the gradient in the x direction, and y is the gradient in the y direction. The root mean square error of z(t+1), x(t+1), and y(t+1) with respect to z(t+1), x(t+1), and y(t+1) is then calculated and compared with a threshold k. If the root means square error is greater than k, it is determined that there is a difference. Alternatively, when the respective differences between z(t+1) and z(t), x(t+1) and x(t), and y(t+1) and y(t) are compared with thresholds kz, kx, and ky, if any difference is greater than the threshold, it is determined that there is a difference. In the case where it is determined that there is a difference, the intraframe location of the block which has been detected to be different is described in the form of a bit map. One bit map is generated in the former case and three bit maps are generated in the latter case. The bit map is a series of "0"s and "1"s (binary data) and compressed by means of run length compression or the like. The difference data Δz(t)=z(t+1)−z(t), Δx(t)=x(t+1)−x(t), and Δy(t)=y(t+1)−y(t) are entropy-compressed. In this first method, decompression is not required, and thus the calculation can be performed in a short time. However, there is a possibility that calculation errors are accumulated.

In a second interframe compression method, the data obtained by the above-described intraframe compression is first decompressed thereby reproducing the data of pixels in each block. After that, the root mean square error of the reproduced pixel data in each block of a frame (t+1) relative to the pixel data in the corresponding block of a previous frame t is calculated and compared with a threshold k. If a block having a root mean square error greater than the threshold k is found, the block is determined to be different. In the case where it is determined that there is a difference, the intraframe location of the block which has been detected to be different is described in the form of a bit map. The bit map is a series of "0"s and "1"s (binary data) and compressed by means of run length compression or the like. The difference data $\Delta z(t)=z(t+1)-z(t)$, $\Delta x(t)=x(t+1)-x(t)$, and $\Delta y(t)=y(t+1)-y(t)$ are entropy-compressed. In this first method, decompression is performed, and thus a rather long calculation time is required. However, there is no possibility that calculation errors are accumulated.

A third interframe compression method is described below. The root mean square error of the reproduced pixel data in each block of a next frame (t+1) relative to the pixel data in the corresponding block of a current frame (t) is calculated and compared with a threshold k. If the root mean square error is greater than k, it is determined that there is a difference. In the case where a difference is detected, the difference $\Delta P$ between the pixel data in the block of the next frame (t+1) and the pixel data in the corresponding block of the current frame is determined. After that, the above-described intraframe compression is performed. The intraframe location of the block which has been detected to be different is descried in the form of a bit map. The bit map is a series of "0"s and "1"s (binary data) and compressed by means of run length compression or the like. The difference data $\Delta P$ is entropy-compressed. In this third method, the compression is performed after determining whether there is a difference. Therefore, this method needs the least amount of calculation and calculation errors are not accumulated.

The 1-bit bit map information stored in the bit map information storage circuit 4 is compressed by a binary image coding technique such as a run length, modified READ (MR, MMR), modified Huffman (MH), or JBIG method. In the case of a binary document image treated by a facsimile machine or the like, there is a high probability that white or black pixels successively appear in one or more continuous areas. Thus, in the run length coding method, one-dimensional segments called runs which include only white or black pixels are employed as units of coding, and the number of pixels included in each run, that is, the length of each run, is employed as a code. For example, in digital facsimiles using a public telephone network, a modified Huffman code is generally used in which the run length model is established separately for black and white pixels.

The modified Huffman coding (MH) is employed as a one-dimensional coding method in facsimile transmission in which an original image is scanned at a pixel density of, for example, 8 pixels/mm thereby obtaining black-and-white pixel information including 1728 pixels per scanning line. The MH code represents the run length, that is, the length of each segment including only white pixels (white run) or only black pixels (black run). variable length codes are assigned to the respective runs using the statistical tendency that white or black runs having particular lengths occur more frequently than the other lengths, thereby reducing the amount of data.

The modified READ (MR, MMR) method is widely used as a technique for performing two-dimensional coding in addition to the one-dimensional coding. In the NR method, up to one successive scanning line with the normal resolution or up to three successive scanning lines with the high resolution are two-dimensionally coded after being one-dimensionally coded. In the NMR method, the MR method is expanded for the infinite number of scanning lines for both the normal and high resolutions.

The method and system for compressing motion image information according to the present invention are characterized in that pixels which are spatially or temporally adjacent are compared to each other, and differential information is generated thereby reducing redundant information between frames. That is, as shown in FIG. 2, pixels t in a frame are compared with corresponding pixels t−1 in a previous frame pixel by pixel, and a 1-bit bit map is generated and stored which indicates whether the absolute value of the difference thereof is greater or not greater than a given parameter P. The entropy coding circuit 6 predicts codes which will appear within a frame and in successive frames, respectively, and outputs small deviations from the predicted codes thereby reducing the redundancy of information. Herein, it is known that when an image signal is coded by means of code assignment and the coded signal is transmitted, the average code length per pixel does not become equal to or less than the average amount of information (entropy).

The algorithm of the adaptive Huffman coding method is described below. In the adaptive Huffman coding method, the predictive coding process including the generation of differential information and the Huffman coding is performed in one step thereby achieving an improvement in the codeword efficiency. In the conventional Huffman coding process, codewords are generally produced using a single Huffman table. In the dynamic Huffman coding, the Huffman table is updated each time one word is coded. In contrast, in the adaptive Huffman coding, there are as many Huffman tables (code tables) as the amount of predicted information, and a proper table is selected by a table selector from the plurality of tables. The coding is performed using the selected table. Thus, data such as image information or audio information is compressed in a highly efficient manner by means of predictive coding.

The algorithm of the adaptive arithmetic coding is described below. In the adaptive arithmetic coding, the predictive coding process including generation of differential information and arithmetic coding is performed in a single step thereby achieving an improvement in the codeword efficiency. In the conventional arithmetic coding, codewords are generally produced using a single occurrence probability table. In the dynamic arithmetic coding, the occurrence probability table is updated each time one word is coded. In contrast, in the adaptive arithmetic coding, there are as many arithmetic tables (decoding tables) as the amount of predicted information, and a proper table is selected by a table selector from the plurality of tables. The coding is performed using the selected table. Thus, data such as image information is compressed in a highly efficient manner by means of predictive coding.

Figure 3:
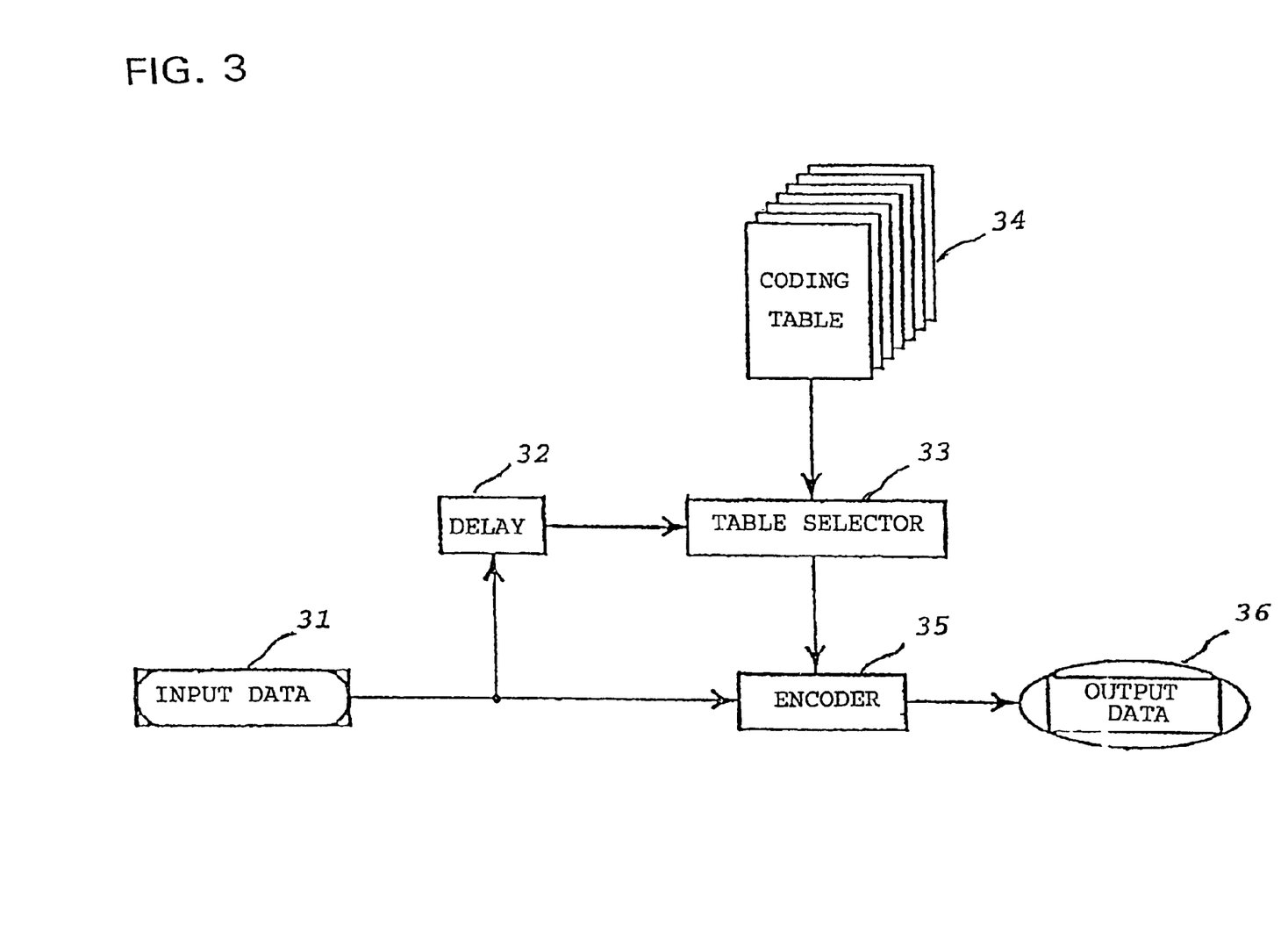
FIG. 3 is a schematic diagram illustrating a coding process.

In the adaptive conversion coding for a motion image, coding is performed after scaling the conversion factors by means of a feedback control in accordance with the filled factor of a transmission buffer memory. In this technique, in accordance with the histogram of conversion factors for a typical image, a threshold value for determining non-significant factors corresponding to signal values which are not coded, a run length code used to encode the continuity of the non-significant factors, and a Huffman coding table used to encode the significant factors are determined, and coding is performed in accordance with them. In a specific predictive coding circuit, as shown in FIG. 3 input image data 31 which has been converted into a digital form by means of analog-to-digital conversion is applied to a table selector 33 after being delayed at a delay circuit 32. This image data is coded and compared with image data stored in code tables 34 at a table selector 33. The input image data 31 is directly applied to an encoder 35. The table selector 33 selects a code table from a plurality of code tables 34 in accordance with the predicted information and sends the selected code table to an encoder 35. The encoder converts the input image data 31 into an adjusted codeword as an output data 36 thereby compressing the input image data 31.

Figure 4:
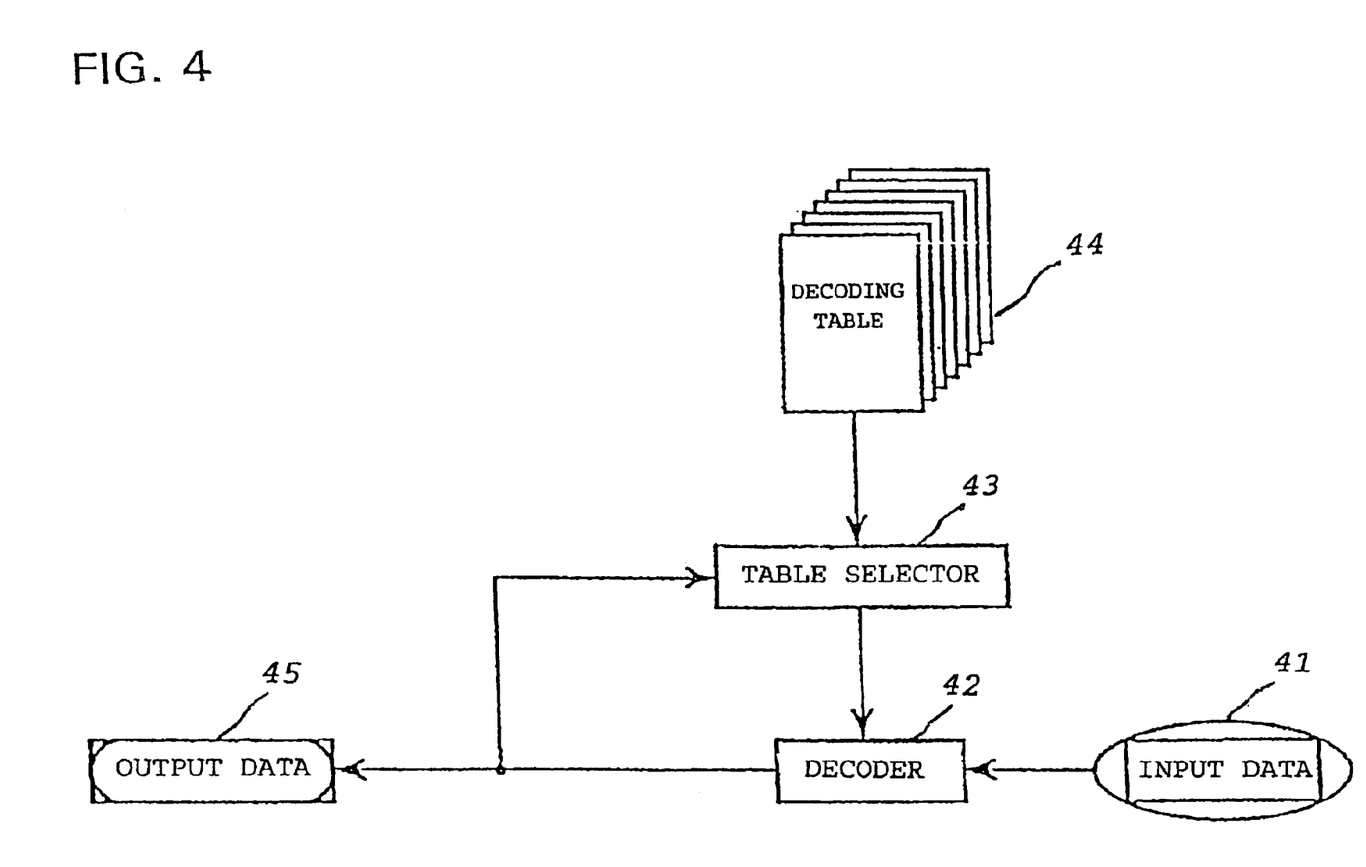
FIG. 4 is a schematic diagram illustrating a decoding process.

FIG. 4 illustrates a specific example of a predictive decoding circuit. As shown in FIG. 4, a codeword as an input data 41 is sent to a decoder 42. The codeword 41 which has been sent directly to the decoder 42 is sent to a table selector 43. The table selector 43 selects a decoding table from a plurality of decoding tables 44 in accordance with predicted information and sends the selected decoding table to the decoder 42. The decoder 42 determines the difference with respect to the pixel value which has already been decoded, thereby obtaining adjusted image data as an output data 45.

Now, a variable block size compression method is described below with reference to FIGS. 6, 7A and 7B. As described above, if the block size is increased, a greater compression ratio is obtained although the details of the original image are lost and the image quality becomes worse. In particular, when an original image consists of a background having a particular uniform color and a line having a small width and having an intensity which is very different from that of the background, there is a possibility that the line with the small width is completely lost. The above problem can be solved by the technique described below. In the following description, it is assumed for simplicity that an image is of monochrome and consists of 16×16 pixels.

Figure 6:
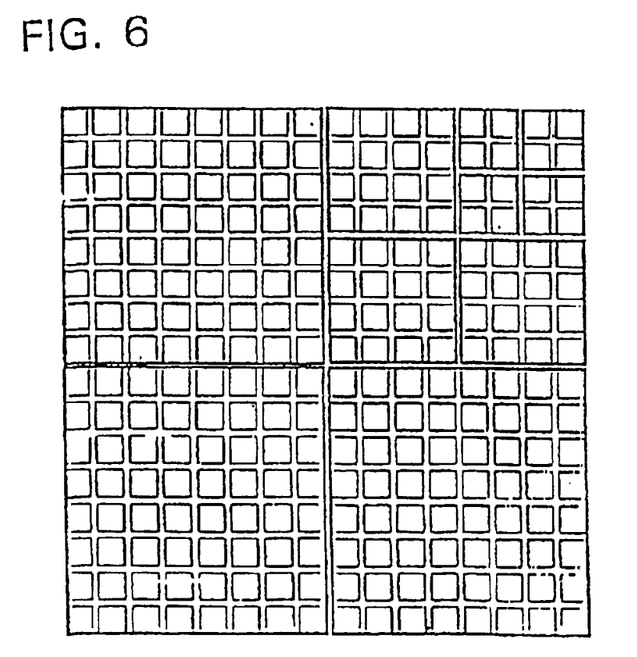
FIG. 6 is a plan view of an intraframe-compressed image.
Figure 7A:
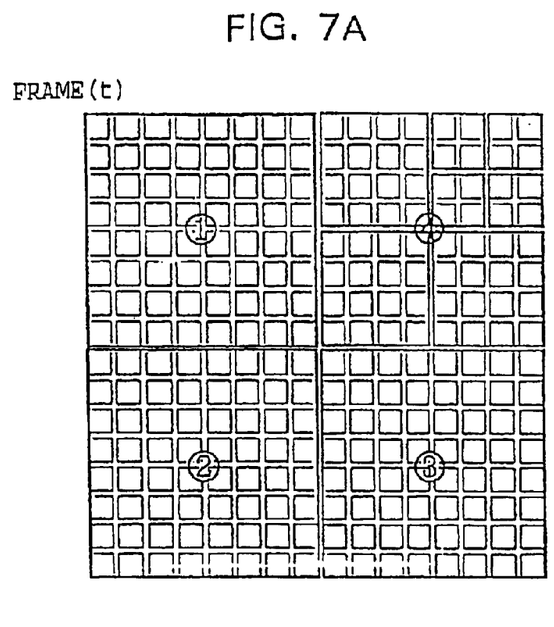
FIG. 7A is a plan view of a frame (t) and FIG. 7B is a plan view of a frame (t+1).
Figure 7B:
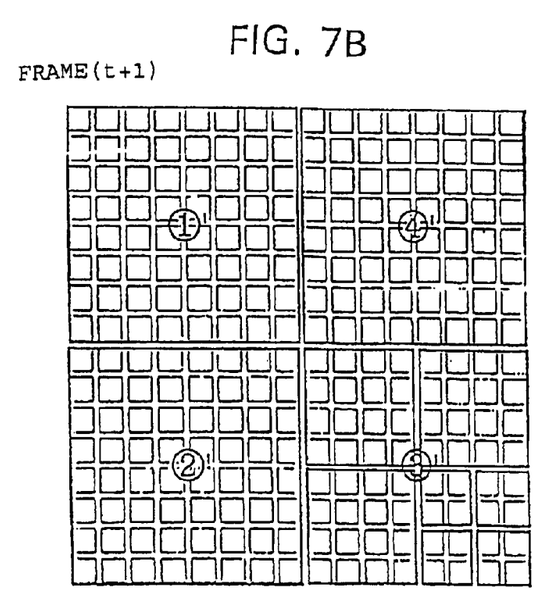

First, as shown in FIG. 6, the block size is set to 16×16, and the whole image is intraframe-compressed (decompressed) according to the above-described method. Each pixel of the decompressed image is compared with the corresponding pixel of the original image, and the difference thereof is compared with a threshold d1. If there is a pixel whose difference is greater than d1, compression (decompression) is performed for a block with a size of 8×8 containing that pixel. In this compression (decompression) process, each of the remaining 8×8 blocks in the same 16×16 block is also compressed. Each pixel of the decompressed image is compared with the corresponding pixel of the original image, and the difference thereof is compared with a threshold d2. If there is a pixel whose difference is greater than d2, compression (decompression) is performed for a block with a size of 4×4 containing that pixel. Also in this compression (decompression) process, each of the remaining 4×4 blocks in the same 8×8 block is also compressed. Each pixel of the decompressed image is compared with the corresponding pixel of the original image, and the difference thereof is compared with a threshold d3. If there is a pixel whose difference is greater than d3, compression (decompression) is performed for a block with a size of 2×2 containing that pixel. In this compression (decompression) process, each of the remaining 2×2 blocks in the same 4×4 block is also compressed. This compression method makes it possible to achieve a high compression ratio without losing the details of the original image.

Interframe compression is further performed after the completion of the above-described intraframe compression. Herein, let us assume that compressed images shown in FIGS. 7A and 7B are obtained for the frame (t) and the frame (t+1), respectively, as a result of the intraframe compression described above. For areas 1→1' and 2→2' having no change in block size, differences are calculated according to one of the methods described above and interframe compression is performed. For the area 4→4' in which an increase in block size occurs, the block in the area 4' is treated as a key block (key frame) which is not dependent upon the previous frame and which can be decompressed without needing the previous frame. In this case, the difference calculation is not performed. For the area 3→3' in which a reduction in block size occurs, the difference between the data of the frame (t+1) and the decompressed data of the frame (t) is calculated for each reduced block and compression is performed for each reduced block.

As can be understood from the above description, the present invention has advantages as described below. That is, the elimination of the block conversion makes it possible to compress image information by means of predictive coding with a high compression ratio and at a high speed while maintaining high image and sound quality. In the present invention, unlike the conventional techniques in which a large difference between frames causes significant degradation in image quality, the degradation in image quality is suppressed by treating 2×2 pixels as one block. That is, the present invention allows an intrablock threshold to be determined so that no significant degradation in image quality occurs and the image quality varies linearly. Thus, it becomes possible to easily adjust the communication bit rate without causing degradation in image quality. Besides, the compression ratio can be improved by about 20% to 50% without resulting in perceptible degradation in image quality. Furthermore, the adaptive Huffman compression process or the adaptive arithmetic compression process is performed in such a manner that the generation of differential information and the Huffman coding process, or the generation of differential information and the arithmetic coding process are performed in one step thereby achieving highly efficient use of codewords and thus achieving highly efficient coding by means of predictive coding.

More specifically, in the method of compressing motion image information according to an aspect of the present invention, including the steps of: comparing pixels in a frame with corresponding pixels in a spatially or temporally adjacent frame and generating differential information in accordance with the comparison result; generating and storing a 1-bit bit map indicating whether the differential information is greater or not greater than a given parameter; and compressing information of a pixel indicated as being greater than the parameter thereby reducing redundant information between frames, the method is characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, thereby allowing motion image information to be compressed in a highly efficient manner.

In the method of compressing image information, according to another aspect of the present invention, by means of comparing spatially or temporally adjacent pixels to each other and generating differential information so as to reduce redundant information between frames, the method including the steps of: comparing corresponding pixels to each other between frames and generating and storing a 1-bit bit map indicating whether the absolute value of the difference thereof is greater or not greater than a given parameter P; treating (deleting) information of a pixel, indicated as being no greater in the absolute value of the difference than the parameter P, as a pixel having no difference between frames; and compressing information of a pixel indicated as being greater than the parameter P, the method is characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, whereby information to be compressed is limited and compressed in a highly efficient manner.

In the method of compressing image information, according to another aspect of the present invention, by means of comparing spatially or temporally adjacent pixels to each other and generating differential information so as to reduce redundant information between frames, the method including the steps of: comparing corresponding pixels to each other between frames and generating and storing a 1-bit bit map indicating whether the absolute value of the difference thereof is greater or not greater than a given parameter P; and compressing information of a pixel indicated as being greater than the parameter P thereby reducing redundant information between frames, the method being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, thereby allowing motion image information to be compressed in a highly efficient manner.

In the method compressing image information, according to still another aspect of the present invention, by means of comparing spatially or temporally adjacent pixels to each other and generating differential information so as to reduce redundant information between frames, the method including the steps of: comparing corresponding pixels to each other between frames and generating and storing a 1-bit bit map indicating whether the absolute value of the difference thereof is greater or not greater than a given parameter P; treating (deleting) information of a pixel, indicated as being not greater than the parameter P, as a pixel having no difference between frames; and compressing information of a pixel indicated as being greater than the parameter P, the method of compressing image information being characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, thereby allowing motion image information to be compressed in a highly efficient manner.

According to still another aspect, the present invention provides the system for compressing motion image information, including entropy coding circuit 6 for reducing redundant information between frames by means of comparing spatially or temporally adjacent pixels to each other and generating differential information, the system including: bit map information storage circuit 4 for comparing pixels t and corresponding pixels t−1 to each other between frames and generating and storing a 1-bit bit map indicating whether the absolute value of the difference thereof is greater or not greater than a given parameter P; and information compression circuit 5 for compressing information in the area indicated, by the bit map stored in the bit map information storage circuit 4, as being greater in the absolute difference value between pixels t and t−1 than the parameter P. wherein the system is characterized in that an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, thereby allowing motion image information to be compressed in a highly efficient manner.

According to still another aspect, the present invention provides the system for compressing motion image information, including entropy coding circuit for reducing redundant information between frames by means of comparing spatially or temporally adjacent pixels to each other and generating differential information, the system including: bit map information storage circuit 4 for comparing pixels t and corresponding pixels t−1 to each other between frames and generating and storing a 1-bit bit map indicating whether the absolute value of the difference thereof is greater or not greater than a given parameter P; and information compression circuit 5 for compressing information in the area indicated, by the bit map stored in the bit map information storage circuit 4, as being greater in the absolute difference value between pixels t and t−1 than the parameter P, and for processing (deleting) pixels in the other area as those having no change between frames, wherein the system is characterized in that an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, whereby information to be compressed is limited and compressed in a highly efficient manner.

The 1-bit bit map information stored in the bit map information storage circuit 4 may be compressed by means of a binary image coding method such as a run length, modified READ (MR, MMR), modified Huffman (MH), or JBIG coding method, thereby making it possible to compress image information in a highly efficient manner by means of predictive coding. This allows an improvement in image quality in digital facsimile transmission or the like using a public telephone network.

In the information compression circuit 5 for compressing information in areas where the absolute difference values are greater than the given parameter P, information compression is performed by means of an adaptive Huffman coding process including as many Huffman tables as the amount of predicted information. The table selector selects a table from the plurality of tables in accordance with the predicted information, and coding is performed using the selected table. Thus it becomes possible to compress image information in a highly efficient manner by means of predictive coding.

Furthermore, the entropy coding circuit 6 includes adaptive arithmetic coding circuit which has as many arithmetic tables as the amount of predicted information and which performs coding in accordance with an arithmetic table selected from the plurality of arithmetic tables. The table selector selects a table from the plurality of tables in accordance with the predicted information, and coding is performed using the selected table. Thus it becomes possible to compress image information in a highly efficient manner by means of predictive coding.

According to still another aspect, the present invention provides the method of compressing motion image information, by means of comparing spatially or temporally adjacent pixels to each other and outputting differential information thereby reducing redundant information between frames, the method including the steps of: comparing corresponding pixels to each other in each block consisting of n×m pixels (n and m are integers equal to or greater than 2), for example, 2×2 pixels, between frames and generating and storing a 1-bit bit map indicating whether the absolute value of the difference thereof is greater or not greater than a given parameter; and compressing information of a pixel indicated as being greater than the parameter P, wherein the method is characterized in that an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, thereby allowing motion image information to be compressed in a highly efficient manner while maintaining high image and sound quality.

According to still another aspect, the present invention provides the method of compressing motion image information, by means of comparing spatially or temporally adjacent pixels to each other and outputting differential information thereby reducing redundant information between frames, the method including the steps of: comparing corresponding pixels to each other in each block consisting of n×m pixels (n and m are integers equal to or greater than 2), for example, 2×2 pixels, between frames and generating and storing a 1-bit bit map indicating whether the absolute value of the difference thereof is greater or not greater than a given parameter; and treating (deleting) information of a pixel, indicated as being no greater in the absolute value of the difference than the parameter P, as a pixel having no difference between frames; and compressing information of a pixel indicated as being greater than the parameter P, wherein the method is characterized in that an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, thereby allowing motion image information to be compressed in a highly efficient manner while maintaining high image and sound quality.

Herein, the 1-bit bit map information may be compressed by means of a binary image coding method such as a run length, modified READ (MR, MMR), modified Huffman (MH), or JBIG coding method, thereby making it possible to compress image information in a highly efficient manner by means of predictive coding. This allows an improvement in image and sound quality in digital facsimile transmission or the like using a public telephone network.

Furthermore, for information in areas where the absolute difference values are greater than the given parameter P, information compression is performed by means of an adaptive Huffman coding process including as many Huffman tables as the amount of predicted information. The table selector selects a table from the plurality of tables in accordance with the predicted information, and coding is performed using the selected table. Thus it becomes possible to compress image information in a highly efficient manner by means of predictive coding.

According to still another aspect, the present invention provides the system for compressing motion image information, including entropy coding circuit 6 for reducing redundant information between frames by means of comparing spatially or temporally adjacent pixels to each other and generating differential information, the system including: bit map information storage circuit 4 for comparing corresponding pixels to each other in each block consisting of n×m pixels (n and m are integers equal to or greater than 2) between frames and generating and storing a 1-bit bit map indicating whether the absolute value of the difference thereof is greater or not greater than a given parameter P; and information compression circuit 5 for compressing information in the area indicated, by the bit map stored in the bit map information storage circuit, as being greater in the absolute difference value between pixels t and t−1 than the parameter P. wherein the system is characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, thereby allowing motion image information to be compressed in a highly efficient manner while maintaining high image and sound quality.

According to still another aspect, the present invention provides the system for compressing motion image information, including entropy coding circuit 6 for reducing redundant information between frames by means of comparing spatially or temporally adjacent pixels to each other and generating differential information, the system including: bit map information storage circuit 4 for comparing corresponding pixels to each other in each block consisting of n×m pixels (n and m are integers equal to or greater than 2) between frames and generating and storing a 1-bit bit map indicating whether the absolute value of the difference thereof is greater or not greater than a given parameter P; and information compression circuit 5 for compressing information in the area indicated, by the bit map stored in the bit map information storage circuit 4, as being greater in the absolute difference value between pixels t and t−1 than the parameter P, and for processing (deleting) pixels in the other area as those having no change between frames, wherein the system is characterized in that: an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction, thereby allowing motion image information to be compressed in a highly efficient manner while maintaining high image and sound quality.

Herein, the 1-bit bit map information stored in the bit map information storage circuit 4 s information indicating the difference presence/absence for n×m blocks (n and m are integers equal to or greater than 2) in a frame and is compressed by means of a binary image coding method such as a run length, modified READ (MR, MMR), modified Huffman (MH), or JBIG coding method, thereby making it possible to compress image information and audio information in a highly efficient manner by means of predictive coding. This allows an improvement in image quality in digital facsimile transmission or the like using a public telephone network.

In the information compression circuit 5 for compressing information in areas where the absolute difference values are greater than the given parameter P, information compression is performed by means of an adaptive Huffman coding process including as many Huffman tables as the amount of predicted information. The table selector selects a table from the plurality of tables in accordance with the predicted information, and coding is performed using the selected table. Thus it becomes possible to compress image information in a highly efficient manner by means of predictive coding.

The entropy coding circuit 6 includes adaptive arithmetic coding circuit which has as many arithmetic tables as the amount of predicted information and which performs coding in accordance with an arithmetic table selected from the plurality of arithmetic tables. The table selector selects a table from the plurality of tables in accordance with the predicted information, and coding is performed using the selected table. Thus it becomes possible to compress image information in a highly efficient manner by means of predictive coding.

Although only some exemplary embodiments of this invention have been described in detail above, those skilled in the art will readily appreciated that many modifications are possible in the exemplary embodiments without materially departing from the novel teachings and advantages of this invention.

Accordingly, all such modifications are intended to be included within the scope of this invention.

What is claimed is:

1. A method of compressing motion image information, comprising the steps of: comparing pixels in a frame with corresponding pixels in a spatially or temporally adjacent frame and generating differential information in accordance with the comparison result; generating and storing a 1-bit bit map indicating whether said differential information is greater or not greater than a given parameter; and compressing information of a pixel indicated as being greater than said parameter thereby reducing redundant information between frames;

wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

2. A method of compressing motion image information, comprising the steps of: comparing pixels in a frame with corresponding pixels in a spatially or temporally adjacent frame and generating differential information in accordance with the comparison result; generating and storing a 1-bit bit map indicating whether said differential information is greater or not greater than a given parameter; treating (deleting) information of a pixel, indicated as being not greater than said parameter, as a pixel having no difference between frames; and compressing information of a pixel indicated as being greater than said parameter; wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

3. A method of compressing motion image information, by means of comparing spatially or temporally adjacent pixels to each other and generating differential information so as to reduce redundant information between frames, said method including the steps of: comparing corresponding pixels to each other between said frames and generating and storing a 1-bit bit map indicating whether the absolute value of the difference thereof is greater or not greater than a given parameter; and compressing information of a pixel indicated as being greater than said parameter so as to reduce redundant information between said frames; wherein an image in each frame is divided into blocks in advance, and each of all blocks is approximated by (replaced with) a single plane defined by three data representing the magnitude, of a pixel value in the block, the block-to-block gradient of the pixel value in an x direction, and the block-to-block gradient of the pixel value in a y direction.

4. A method of compressing motion image information, by means of comparing spatially or temporally adjacent pixels to each other and generating differential information so as to reduce redundant information between frames, said method including the steps of: comparing corresponding pixels to each other between said frames and generating and storing a 1-bit bit map indicating whether the absolute value of the difference thereof is greater or not greater than a given parameter; treating (deleting) information of a pixel, indicated as being not greater than said parameter, as a pixel having no difference between frames; and compressing information of a pixel indicated as being greater than said parameter; wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

5. A method of compressing motion image information, according to one of claims 1 to 4, wherein the 1-bit bit map information stored in said bit map is compressed by means of a binary image coding method such as a run length, modified READ (MR, MMR), modified Huffman (MH), or JBIG coding method.

6. A method of compressing motion image information, according to one of claims 1 to 4, wherein information which is indicated as being greater than said parameter is compressed by means of an adaptive Huffman coding process including as many Huffman tables as the amount of predicted information.

7. A system for compressing motion image information, including entropy coding circuit for reducing redundant information between frames by means of comparing spatially or temporally adjacent pixels to each other and generating differential information, said system comprises bit map information storage circuit that compares pixels t and corresponding pixels t−1 to each other between frames and generating and storing a 1-bit bit map indicating whether the absolute value of the difference thereof is greater or not greater than a given parameter; and information compression circuit that compresses information of a pixel indicated, by the bit map stored in said bit map information storage circuit, as being greater in the absolute difference value between pixels t and t−1 than said parameter; wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

8. A system for compressing motion image information, including entropy coding circuit that reduces redundant information between frames by means of comparing spatially or temporally adjacent pixels to each other and generating differential information, said system comprises: bit map information storage circuit that compares pixels t and corresponding pixels t−1 to each other between frames and generating and storing a 1-bit bit map indicating whether the absolute value of the difference thereof is greater or not greater than a given parameter; and information compression circuit which treats (deletes) information of a pixel indicated, by the bit map stored in said bit map information storage circuit, as being not greater in the absolute difference value between pixels t and t−1 than said parameter, and which compresses information of the other pixels indicated as being greater in the absolute difference value than said parameter; wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

9. A system for compressing motion image information, according to claim 7 or 8, wherein the 1-bit bit map information stored in said bit map information storage circuit is compressed by means of a binary image coding method such as a run length, modified READ (MR, MMR), modified Huffman (MH), or JBIG coding method.

10. A system for compressing motion image information, according to claim 7 or 8, wherein said information compression circuit that compresses information of a pixel indicated as being greater in the absolute difference value than said parameter performs said information compression by means of an adaptive Huffman coding process including as many Huffman tables as the amount of predicted information.

11. A system for compressing motion image information, according to claim 7 or 8, wherein said entropy coding circuit includes adaptive arithmetic coding circuit which has as many arithmetic tables as the amount of predicted information and which performs coding in accordance with an arithmetic table selected from said plurality of arithmetic tables.

12. A method of compressing image information, by means of comparing spatially or temporally adjacent pixels to each other and generating differential information so as to reduce redundant information between frames, said method including the steps of: comparing corresponding pixels to each other in each block consisting of n×m pixels (n and m are integers equal to or greater than 2) between frames and generating and storing a 1-bit bit map indicating whether the absolute value of the difference thereof is greater or not greater than a given parameter; and compressing information of a pixel indicated as being greater than said parameter, wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

13. A method of compressing motion image information, by means of comparing spatially or temporally adjacent pixels to each other and outputting differential information thereby reducing redundant information between frames, said method including the steps of: comparing corresponding pixels to each other in each block consisting of n×m pixels (n and m are integers equal to or greater than 2) between frames and generating and storing a 1-bit bit map indicating whether the absolute value of the difference thereof is greater or not greater than a given parameter; treating (deleting) information of a pixel, indicated as being no greater in the absolute value of the difference than said parameter, as a pixel having no difference between frames; and compressing information of a pixel indicated as being greater than said parameter; wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

14. A method of compressing motion image information, according to claim 12 or 13, wherein the 1-bit bit map information stored in said bit map is compressed by means of a binary image coding method such as a run length, modified READ (MR, MMR), modified Huffman (MH), or JBIG coding method.

15. A method of compressing motion image information, according to claim 12 or 13, wherein information of a pixel indicated as being greater in the absolute difference value than said parameter is compressed by means of an adaptive Huffman coding process including as many Huffman tables as the amount of predicted information.

16. A system for compressing motion image information, including entropy coding circuit that reduces redundant information between frames by means of comparing spatially or temporally adjacent pixels to each other and generating differential information, said system including: bit map information storage circuit that compares corresponding pixels to each other in each block consisting of n×m pixels (n and m are integers equal to or greater than 2) between frames and generating and storing a 1-bit bit map indicating whether the absolute value of the difference thereof is greater or not greater than a given parameter; and information compression circuit that compresses information of a pixel indicated, by the bit map stored in said bit map information storage circuit, as being greater in the absolute difference value between pixels t and t−1 than said parameter; wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

17. A system for compressing motion image information, including entropy coding circuit that reduces redundant information between frames by means of comparing spatially or temporally adjacent pixels to each other and generating differential information, said system including: bit map information storage circuit that compares corresponding pixels to each other in each block consisting of n×m pixels (n and m are integers equal to or greater than 2) between frames and generating and storing a 1-bit bit map indicating whether the absolute value of the difference thereof is greater or not greater than a given parameter; and information compression circuit which treats (deletes) information of a pixel indicated, by the bit map stored in said bit map information storage circuit, as being not greater in the absolute difference value between pixels t and t−1 than said parameter, and which compresses information of the other pixels indicated as being greater in the absolute difference value than said parameter; wherein an image in each frame is divided into blocks in advance, and each of all blocks is approximated by (replaced with) a single plane defined by three data representing the magnitude of a pixel value in the block, the block-to-block gradient of the pixel value in an x direction, and the block-to-block gradient of the pixel value in a y direction.

18. A system for compressing motion image information, according to claim 16 or 17, wherein said 1-bit bit map information stored in the bit map information storage circuit is information indicating the difference presence/absence for n×m blocks (n and m are integers equal to or greater than 2) in a frame and is compressed by means of a binary image coding method such as a run length, modified READ (MR, MMR), modified Huffman (MH), or JBIG coding method.

19. A system for compressing motion image information, according to claim 16 or 17, wherein said information compression circuit that compresses information of a pixel indicated as being greater in the absolute difference value than said parameter performs said information compression by means of an adaptive Huffman coding process including as many Huffman tables as the amount of predicted information.

20. A system for compressing motion image information, according to claim 16 or 17, wherein said entropy coding circuit includes adaptive arithmetic coding circuit which has as many arithmetic tables as the amount of predicted information and which performs coding in accordance with an arithmetic table selected from said plurality of arithmetic tables.

* * * * *